(12) United States Patent
Chou et al.

(10) Patent No.: US 7,809,846 B2
(45) Date of Patent: Oct. 5, 2010

(54) RESILIENT APPLICATION LAYER OVERLAY FRAMEWORK FOR CONVERGED COMMUNICATION OVER INTERNET PROTOCOL NETWORKS

(75) Inventors: Wu Chou, Basking Ridge, NJ (US); Feng Liu, Raritan, NJ (US)

(73) Assignee: Avaya Inc., Basking Ridge, NJ (US)

( * ) Notice: Subject to any disclaimer, the term of this patent is extended or adjusted under 35 U.S.C. 154(b) by 1257 days.

(21) Appl. No.: 10/953,033

(22) Filed: Sep. 29, 2004

(65) Prior Publication Data

US 2005/0198320 A1 Sep. 8, 2005

Related U.S. Application Data

(60) Provisional application No. 60/549,003, filed on Mar. 1, 2004, provisional application No. 60/556,833, filed on Mar. 26, 2004.

(51) Int. Cl.
*G06F 15/16* (2006.01)
(52) U.S. Cl. .................... 709/230; 709/218; 709/227; 370/437; 370/352; 455/432.3
(58) Field of Classification Search ................ 709/230, 709/227, 218; 370/437, 352; 455/432.3
See application file for complete search history.

(56) References Cited

U.S. PATENT DOCUMENTS

| | | | |
|---|---|---|---|
| 6,434,127 B1 | 8/2002 | Ha | |
| 6,931,447 B1 * | 8/2005 | Hemstreet et al. | ............ 709/227 |
| 7,031,264 B2 | 4/2006 | Adhikari et al. | |
| 7,042,880 B1 * | 5/2006 | Voit et al. | ................. 370/395.1 |
| 7,283,270 B2 * | 10/2007 | Boire-Lavigne et al. | ... 358/1.15 |
| 7,313,098 B2 | 12/2007 | Bearden et al. | |
| 7,333,477 B2 * | 2/2008 | Malik | ........................ 370/352 |
| 7,389,328 B2 * | 6/2008 | Yeung et al. | ................. 709/218 |
| 2003/0014488 A1 * | 1/2003 | Dalal et al. | ................. 709/204 |
| 2003/0097447 A1 | 5/2003 | Johnston | |
| 2003/0131142 A1 | 7/2003 | Horvitz et al. | |
| 2004/0062204 A1 | 4/2004 | Bearden et al. | |
| 2004/0220810 A1 * | 11/2004 | Leask et al. | .............. 704/270.1 |
| 2004/0246947 A1 * | 12/2004 | Wong | ........................ 370/352 |

(Continued)

OTHER PUBLICATIONS

Cheema, Umar, "U.S. Appl. No. 10/953,089 Examiner's Answer Brief Sep. 24, 2009", , Publisher: USPTO, Published in: US.

(Continued)

*Primary Examiner*—Tammy T Nguyen
(74) *Attorney, Agent, or Firm*—Joseph B. Ryan; Jason Paul DeMont; Wayne S. Breyer

(57) ABSTRACT

Methods and apparatus for providing converged communication services in a communication system are disclosed. A first endpoint of the system communicates with at least a second endpoint of the system via session initiation protocol (SIP). At least a portion of the SIP communication is controlled utilizing an application layer overlay framework which permits substantially simultaneous operation of the first endpoint in two application layer protocols, the two application layer protocols including SIP and web services protocol. The web services protocol may illustratively comprise an application layer web services transport protocol such as SOAP/HTTP. The application overlay framework comprises a web services interface, with the web services interface being configured to permit access to information associated with the SIP communication by one or more communication service applications of the system.

20 Claims, 3 Drawing Sheets

U.S. PATENT DOCUMENTS

2005/0063411 A1* 3/2005 Wang et al. .................. 370/437
2006/0222166 A1* 10/2006 Ramakrishna et al. . 379/265.09
2008/0076413 A1* 3/2008 Jones ...................... 455/432.3

OTHER PUBLICATIONS

Cheema, Umar, "U.S. Appl. No. 10/953,089 Office Action Dec. 24, 2008", , Publisher: USPTO, Published in: US.

Cheema, Umar, "U.S. Appl. No. 10/953,089 Office Action Mar. 20, 2008", , Publisher: USPTO, Published in: US.

Cheema, Umar, "U.S. Appl. No. 10/953,089 Office Action Jul. 3, 2008", , Publisher: USPTO, Published in: US.

Cheema, Umar, "U.S. Appl. No. 10/953,089 Panel Decision Apr. 20, 2009", , Publisher: USPTO, Published in: US.

* cited by examiner

RESILIENT APPLICATION LAYER OVERLAY FRAMEWORK FOR CONVERGED COMMUNICATION OVER INTERNET PROTOCOL NETWORKS

RELATED APPLICATION(S)

The present application claims the priority of U.S. Provisional Patent Applications Ser. No. 60/549,003, filed Mar. 1, 2004 and entitled "WSIP—Web Service SIP Endpoint for Converged Multimedia/Multimodal Communication Over IP," and Ser. No. 60/556,833, filed Mar. 26, 2004 and entitled "WSIP—A Resilient Application Layer Overlay Framework for Converged Communication Services Over IP," the disclosures of which are hereby incorporated by reference herein.

The present application is related to U.S. patent application Ser. No. 10/953,089, filed concurrently herewith and entitled "Web Services and Session Initiation Protocol Endpoint for Converged Communication Over Internet Protocol Networks," the disclosure of which is hereby incorporated by reference herein.

FIELD OF THE INVENTION

The invention relates generally to the field of communication systems, and more particularly to techniques for providing converged communication in such systems.

BACKGROUND OF THE INVENTION

Converged communication refers generally to an arrangement in which users can communicate seamlessly, through multimedia and multimodal interaction, utilizing a variety of different types of endpoint devices and network infrastructure. Implementation of such functionality may make use of the session initiation protocol (SIP), as described in RFC 3261 of the Internet Engineering Task Force (IETF), which is incorporated by reference herein. For example, SIP is one of the most important protocols for implementation of voice over Internet protocol (VoIP) communication on Internet-enabled devices. The continuing growth of IP networks and the recognized need for VoIP as an alternative to calls over a public switched telephone network (PSTN) is expected to accelerate the acceptance of SIP as the primary application layer protocol for implementing next generation VoIP in the converged communication context.

Despite the success of SIP as an efficient VoIP protocol, SIP is under constant expansion in order to support new communication services which are not covered in its original scope, such as messaging, authentication, presence, etc. This has made it increasingly difficult to integrate SIP in a converged communication arrangement involving such services. Accordingly, a need exists for an extensible service integration environment that facilitates the integration of SIP in converged communication applications.

SUMMARY OF THE INVENTION

The present invention meets the above-identified need by providing an application layer overlay framework which leverages both SIP and web services to implement reliable converged communications over IP networks.

In accordance with one aspect of the invention, a first endpoint of the system communicates with at least a second endpoint of the system via SIP. At least a portion of the SIP communication is controlled utilizing an application layer overlay framework which permits substantially simultaneous operation of the first endpoint in two application layer protocols, the two application layer protocols including SIP and a web services protocol. The web services protocol may illustratively comprise an application layer web services transport protocol such as SOAP/HTTP, where SOAP denotes the simple object access protocol, HTTP denotes the hypertext transfer protocol, and "/" denotes "and/or." The application overlay framework comprises a web services interface, with the web services interface being configured to permit access to information associated with the SIP communication by one or more communication service applications of the system.

In accordance with another aspect of the invention, the SIP communication may be accessible as a web service allowing an authorized network administrator to monitor the quality of the communication on demand. The quality monitoring may be based, for example, on transmission and reception statistics associated with the SIP communication that are computed from respective sender reports and receiver reports of real-time transport control protocol (RTCP) packets.

In an illustrative embodiment, a given one of the communication service applications comprises a network monitor service application that is accessible to the first endpoint via a web service request. The web service request may be triggered responsive to an alarm indicating that one or more network condition parameters have deviated from desired values.

Advantageously, the application layer overlay framework is utilizable in administration of dynamic network resource management for communication services over Internet protocol networks. For example, the application layer overlay framework may be configured to control implementation of one or more network resource management policies on demand. More specifically, the application layer overlay framework may be utilizable by a network administrator to temporarily disable one or more bandwidth resource demanding services on the endpoints without interfering with other services. In such an arrangement, the web services interface of the application layer overlay framework may be utilizable by the network administrator to temporarily disable a given communication session between the first and second endpoints in the presence of a bandwidth shortage without disrupting other on-going communication sessions between the endpoints.

The invention provides substantial improvements over conventional techniques. For example, the invention in the illustrative embodiment noted above provides a unified service integration environment based on web services that extends the separation of signaling and media transmission in SIP to a new multi-tier architecture that separates signaling, media transmission and service integration.

DETAILED DESCRIPTION OF THE INVENTION

The invention will be described below in conjunction with a number of exemplary communication systems. It should be understood, however, that the invention is not limited to use with any particular type of communication system or any particular configuration of endpoints or other processing elements of the system. Those skilled in the art will recognize that the disclosed techniques may be used in any communication system application in which it is desirable to provide improved converged communication functionality.

Figure 1:
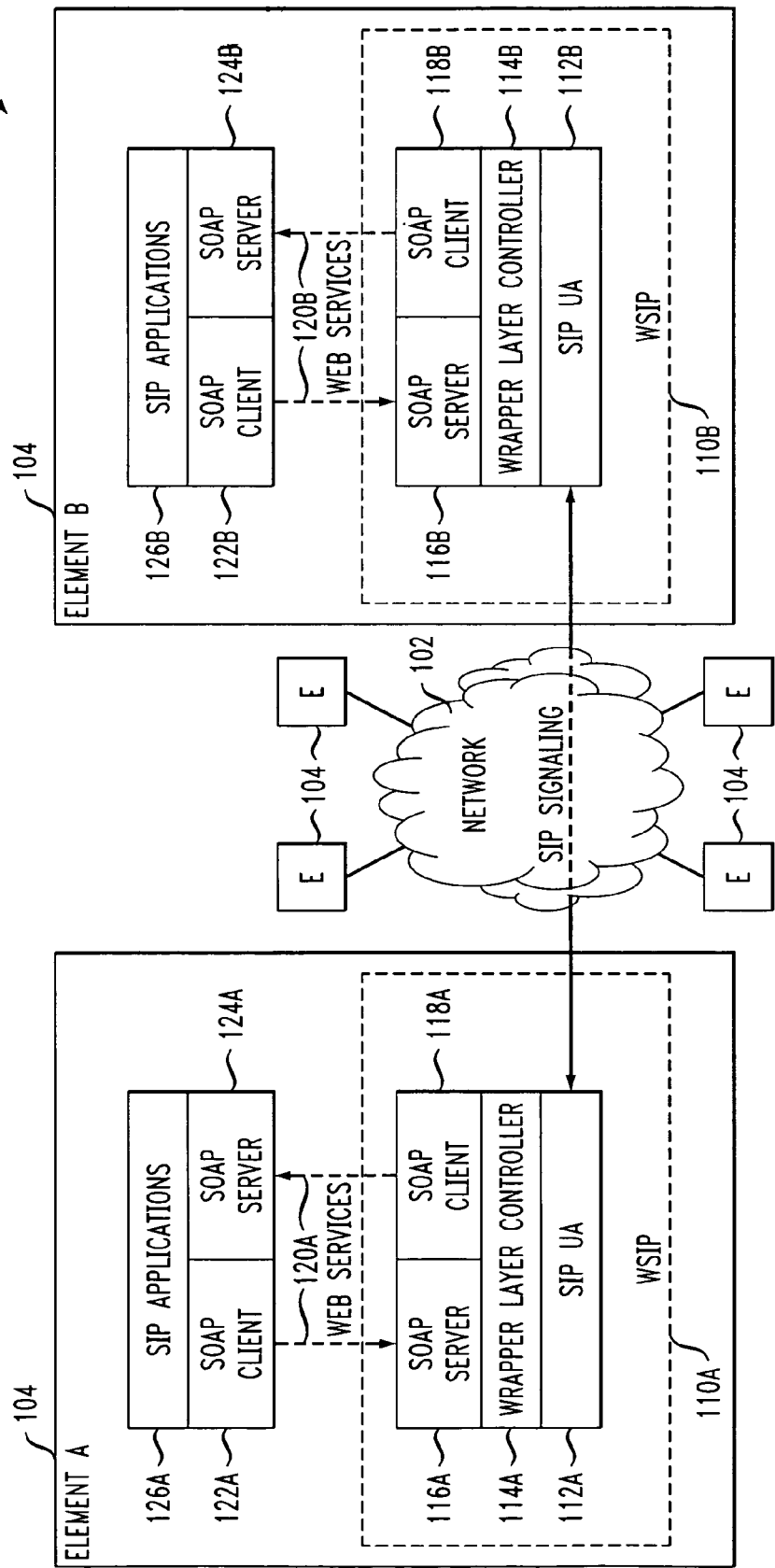
FIG. 1 shows an exemplary communication system configured in accordance with an illustrative embodiment of the invention.

FIG. 1 shows an example communication system 100 in which the present invention is implemented. The system 100 comprises a network 102 and a plurality of processing elements 104, the processing elements 104 more specifically including a pair of processing elements denoted as Element A and Element B. A given one of the processing elements 104 may comprise a communication terminal, for example, a mobile device, such as a mobile telephone, PDA or portable computer, or a non-mobile device, such as a desktop computer, a server or a set of servers, or more generally any other type of processor-based device or set of devices suitably configured for communication within system 100. Conventional aspects of these and other devices utilizable in system 100 are well known in the art and therefore not described in further detail herein.

The network 102 may represent, by way of example, a global communication network such as the Internet, an intranet, a wide area network, a metropolitan area network, a local area network, a wireless cellular network, or a satellite network, as well as portions or combinations of these or other wired or wireless communication networks. Implementation of the present invention thus does not require any particular type of network or set of networks.

In accordance with an aspect of the invention, each of Element A and Element B comprises what is referred to herein as a WSIP endpoint. Such an endpoint generally includes a SIP component configured for communication via SIP signaling with one or more other endpoints of the system, and a web services component configured for interfacing the SIP component to one or more communication service applications of the processing device. In this illustrative embodiment, each WSIP endpoint is both a SIP endpoint that communicates with other SIP endpoints through SIP signaling, and a web services node that provides a generic service integration environment for SIP applications. Advantageously, such an arrangement considerably facilitates the implementation of converged communication functionality in system 100.

Referring again to the figure, Element A implements a WSIP endpoint 110A. The SIP component of the WSIP endpoint 110A comprises a SIP user agent (UA) 112A and a wrapper layer controller (WLC) 114A. The web services component of the WSIP endpoint 110A comprises a simple object access protocol (SOAP) server 116A and a SOAP client 118A.

The SIP UA 112A in WSIP 110A is responsible for SIP signaling and media transmission. It handles functions such as making a SIP call, answering an inbound SIP call, disconnecting the call, holding the call, etc., in accordance with the SIP protocol. It also sends call-related events to the WLC 114A, such as call arrival, call hang-up, media change, etc.

The SIP UA exposes a set of application program interfaces (APIs) to the WLC for basic communication service using SIP, such as MakeCall, SendIM, HangupCall, etc. The WLC wraps the API functions of the SIP UA into an extensible mark-up language (XML) format suitable for processing by the web services component of WSIP endpoint 110A.

The web services component of WSIP endpoint 110A is a SOAP node, and as indicated above, comprises both a SOAP server 116A and a SOAP client 118A. Web services, generally described in the World Wide Web Consortium (W3C) working draft entitled "Web Service Architecture," which is incorporated by reference herein, separates the service protocol and application data from the application layer protocol. It encapsulates the service protocol and application data in a SOAP message, where SOAP denotes an XML standard from W3C, the corresponding specification document also be incorporated by reference herein. Web services thus provides a standard format for XML-based remote procedure call and data exchange. This allows web services to be supported on multiple application layer protocols, such as hypertext transfer protocol (HTTP) and simple mail transfer protocol (SMTP).

In addition, the web services component provides a standard service integration environment through the use of web service description language (WSDL). It allows dynamic application service binding between the SOAP message and the service APIs. This results in a distributive service model, where multiple services and platforms can be linked remotely through the exchange of SOAP messages to perform business transactions.

The web services component of the WSIP endpoint 110A communicates over a web services interface 120A with SOAP client 122A and SOAP server 124A, both associated with one or more SIP applications 126A. More specifically, SOAP client 122A communicates with SOAP server 116A of the web services component, and SOAP server 124A communicates with SOAP client 118A of the web services component.

Use of web services to interface the SIP component of WSIP endpoint 110A to SIP applications 126A advantageously avoids further complication of the SIP protocol, by separating SIP signaling from the service integration environment.

Element B operates in substantially the same manner as Element A, and includes WSIP endpoint 110B, SIP UA 112B, WLC 114B, SOAP server 116B, SOAP client 118B, web services interface 120B, SOAP client 122B, SOAP server 124B, and SIP applications 126B. References to any of these identifying numerals herein without an A or B suffix should be understood to refer to the corresponding part of either Element A or Element B.

The two WSIP endpoints 110A and 110B can communicate directly with one another via conventional SIP signaling as shown. These endpoints can also communicate directly with one another using SOAP, through their respective web services components. In addition, the WSIP endpoints 110A and 110B can each communicate with one or more SIP applications of the system, whether co-located therewith on the same processing element or implemented on another processing element of the system. For example, a SIP phone call to alert a customer to the arrival of his product order can be initiated by an application associated with a remote agent who travels on the road with only a web connection.

The system 100 may include additional elements not explicitly shown in the figure, such as routers, gateways or other network elements. The system may also or alternatively include one or more communication system switches, such as a DEFINITY® Enterprise Communication Service (ECS) communication system switch available from Avaya Inc. of Basking Ridge, N.J., USA. Another example call processing switch suitable for use in conjunction with the present invention is the MultiVantage™ communication system switch, also available from Avaya Inc. The term "processing element" as used herein is intended to include such switches, as well as routers, gateways or other network elements. A WSIP endpoint of the type described above can be incorporated into any such processing element.

It is therefore to be appreciated that the present invention does not require the particular arrangements shown in FIG. 1, and numerous alternative configurations suitable for providing the converged communication functionality described herein will be readily apparent to those skilled in the art.

Figure 2:
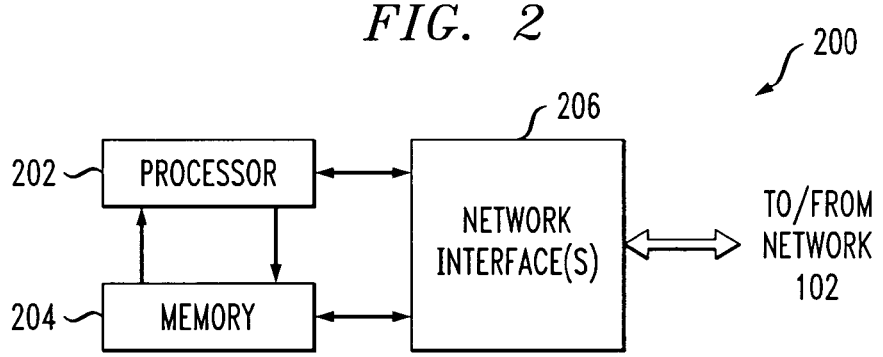
FIG. 2 is a simplified block diagram showing one possible implementation of an endpoint or other processing element of the FIG. 1 system.

FIG. 2 shows one possible implementation of a given processing element 104 of the FIG. 1 system. The processing element 200 as shown in the figure includes a processor 202 coupled to a memory 204 and one or more network interfaces 206. The techniques of the present invention may be implemented at least in part in the form of software storable in the memory 204 and executable by the processor 202. The memory 204 may represent random access memory (RAM), read-only memory (ROM), optical or magnetic disk-based storage, or other storage elements, as well as portions or combinations thereof.

Those skilled in the art will recognize that the individual elements of FIG. 2 as shown for illustrative purposes may be combined into or distributed across one or more processing devices, e.g., a microprocessor, an application-specific integrated circuit (ASIC), a computer or other device(s).

The FIG. 2 arrangement is also considerably simplified for purposes of illustration. For example, if viewed as representative of a mobile telephone, the processing element 200 may include conventional elements typically associated with such a device, such as codecs and other voice signal processing hardware or software elements.

Referring again to FIG. 1, the following are examples of web services functions that may be implemented in a WSIP endpoint of Element A or Element B. These are merely examples, and should not be viewed as limiting in any way.

1. Receive and parse a SOAP request at the SOAP server 116.

2. Bind SOAP service request to WLC 114 in accordance with the WSDL specification, and execute the request by calling the corresponding API functions of SIP UA 112.

3. Receive a SIP event from SIP UA 112, and propagate the event to WLC 114.

4. Package the event into a SOAP message, and send the event notification message to application(s) 126 through SOAP client 118.

5. WSIP system services (described below).

The WSIP system services provide a set of web service functions for configuration, testing, maintenance and update of SIP UA 112. This allows a SIP service application to dynamically discover and configure the SIP UA functions through the web services interface. A SOAP message for WSIP system services can contain instructions to WLC 114 with configuration parameters. For example, such a configuration message may include information specifying the maximum number of calls that the SIP UA is allowed to handle, the media type and formats that the SIP UA can access, and the type of media coder to be used by the SIP UA. This is a very useful feature for controlling network congestion.

The WSIP system services allow the WSIP endpoint to be maintained and updated on demand and dynamically. System administrators can use web services to install a new version of one or more SIP UA 112 components through WLC 114. With proper authorization, the WLC can install new SIP UA components automatically without user intervention. This capability of the WSIP endpoint is particularly important for communication using SIP, because there are large installation bases of SIP phones and other devices, and the SIP standard is under frequent revision. Maintaining interoperability between SIP UAs of the various installed bases has therefore been difficult, and the WSIP approach overcomes this problem. In addition, the discovery capability of web services combined with the WSIP system services enables the system administrator to monitor, discover, update and even repair a WSIP endpoint. The functionalities of WSIP can be published through a standard web services process, and the WSDL-based service integration environment facilitates the creation of applications.

It should be noted that the web services component of WSIP endpoint 110 is a stateful component. It contains the status of the SIP UA 112, such as the number of active calls, the port number that is being used, etc. It also contains the status of each active call, for example, session type (voice, instant message), the state of the session (ringing, call is proceeding), caller ID, starting time, etc. So it is important to guarantee that all the states can be kept correctly. It is up to the application to maintain and manage a given stateful transaction. This situation is further complicated in situations in which the WSIP endpoint is handling multiple threads, where these threads can be initiated by either the SIP UA or the application through the web services component.

It may therefore be beneficial for the web services component to maintain a contact history registry, based on one or more rules. For example, a rule may be established specifying that if a contact event of a call is initiated or answered by one application, all the subsequent contact events of that call have to be forwarded to the same application. As a more particular example, a given rule may specify that if an application initiates a SIP call through the web services component of the WSIP endpoint, then all subsequent events of that application have to interact to the same thread on the SIP UA, until the final hang up of the call.

To address these issues, a given embodiment may incorporate a two-way web service proxy to manage the many-to-many two-way connections between the WSIP endpoint web services component and the applications 126. The web service proxy may be configured, by way of example, to perform the following functions.

1. Use XML condition/action rules to specify which application to launch based on contact events received from the SIP UA 112.

2. Maintain a web service registry for contacts from the WSIP SOAP server 116.

3. Maintain sessions between applications 126 and applications running on the SIP UA, if necessary.

Each external application web service may be assigned a unique service key, which may be a uniform resource identifier (URI), and when a new contact is routed to the WSIP endpoint, the event XML includes the service key, event type and contact description, among other information. If necessary, the web service proxy will launch the specified application, and create a session that maintains the relationship between the external web service that submits the application and the state of the application that is running on the SIP UA. This process will be discussed in greater detail below in the context of WSIP event notification.

In a particular implementation based on Microsoft SOAP Toolkit 3.0 and an IIS web server on Win2K, the web service proxy is preferably configured as a COM+ service that uses a Singleton pattern to represent the session table, so that the session connections between the web service proxy and the SIP UA can be maintained throughout the interaction.

Another issue relates to making the web service thread safe. Since the WSIP web services component allows multiple applications to access the SIP UA simultaneously, it is important for the SIP UA to guarantee synchronization. For example, if two sessions are requesting real-time transport protocol (RTP) ports from a port manager, it is important for the port manager to use a synchronization technique, such as the "mutex" technique, to make sure that it assigns different ports to the two sessions.

Event notification will now be described in greater detail. An application 126 can access services of the SIP UA 112 of the WSIP endpoint 110 by having its associated SOAP client 122 send a service request through the web services interface 120A. For example, the application can make a SIP call by sending an appropriate SOAP request configured in accordance with the WSDL specification.

In order for the application to receive the SIP UA events, the WSIP endpoint may implement an event notification mechanism such as Version 1.0 of the IBM Web Service Notification (WS-Notification). The WSIP endpoint, the event producer, provides a SUBSCRIBE service. This allows the event consumer, a SIP application, to register or "subscribe" the event and the event handler of interest. Such information can be stored in an event registration table. In order for the SIP UA to send the event to the application, the application first exposes the event handling function NOTIFY as a web service, then subscribes the events to the SIP UA by sending a SOAP message through its associated SOAP client. The SOAP message identifies the event of interest, and the corresponding event handler, using WSDL.

When a subscribed event occurs, the WSIP endpoint 110 looks up the registration table, finds the subscribing application(s), and then sends the event to the subscribing application(s) using its SOAP client 118. A given application may use a message queue to store the event temporarily. When the SOAP server 124 receives an event, it simply posts the event to the message queue. Another thread keeps retrieving the message from the queue, and processing all the events asynchronously.

Figure 3:
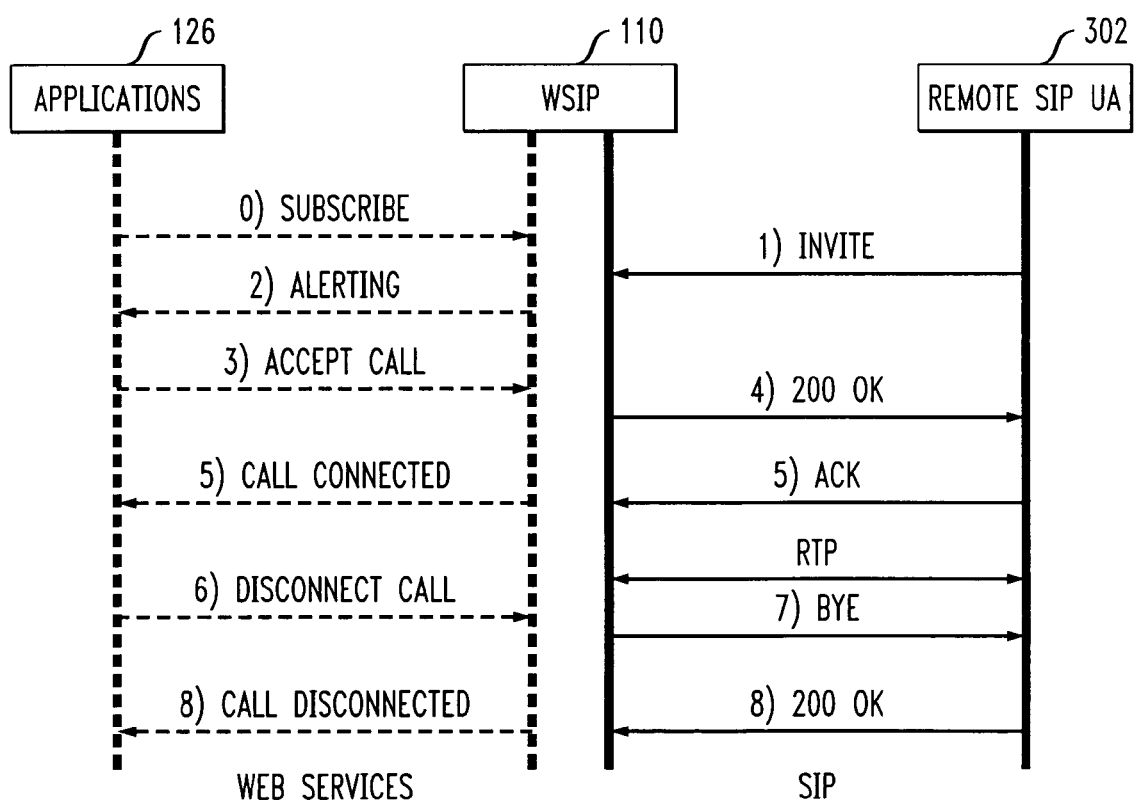
FIG. 3 is a diagram illustrating an exemplary call flow in the FIG. 1 system.

FIG. 3 shows an example of a call flow process implemented in the FIG. 1 system. Communications between SIP application 126 and WSIP endpoint 110 occur via the web services interface 120, and are shown as dashed lines. Communications between the WSIP endpoint 110 and a SIP UA 302 associated with the remote end of the call occur via SIP signaling, and are shown as solid lines. The process includes the following steps.

0. SIP application 126 subscribes the events CallArrival, CallHangup, CallAnswered, etc., to WSIP endpoint 110.

1. When a remote SIP endpoint having a SIP UA calls SIP UA 112, a SIP INVITE message is received.

2. SIP UA 112 notifies WLC 114 about the event, which wraps the event and sends it to SIP application 126.

3. After receiving the CallArrival event, SIP application 126 may pick up the call by sending an AnswerCall message to WSIP endpoint 110.

4. SIP UA 112 sends a "200 OK" message to the remote SIP UA, and the call is set up.

5. SIP UA 112 sends a CallAnswered event to SIP application 126. The call may be conducted using RTP between WSIP endpoint 110 and the remote SIP UA.

6. When SIP application 126 wants to end the call, it sends a HangupCall message to WSIP endpoint 110.

7. SIP UA 112 sends a BYE message to the remote SIP UA to disconnect the call.

8. WSIP endpoint 110 receives a "200 OK" message from the remote SIP UA, and sends a CallDisconnected event to SIP application 126.

This call flow process is presented by way of example only, and should not be construed as limiting the scope of the invention in any way. Numerous alternative communication services may be implemented in the system 100 in accordance with the invention.

The WSIP endpoint 110 can be easily integrated with a wide variety of XML-based applications. For example, the WSIP endpoint 110 can be configured to utilize the XML-based switching and call control environment provided by CSTA from ECMA. See Standard ECMA-269, "Services for Computer Supported Telecommunications Applications (CSTA) Phase III," and Standard ECMA-323, "XML Protocol for Computer Supported Telecommunications Applications (CSTA) Phase III," both of which are incorporated by reference herein. CSTA provides a standardized abstraction layer for applications to perform call and device control in a business telecommunication environment. ECMA-348 (CSTA-WSDL) provides a web services description language specification for functions in CSTA. See Standard ECMA-348, "Web Service Description Language for CSTA Phase III," which is incorporated by reference herein.

Another aspect of the WSIP approach described herein is the provision of an application layer overlay framework which leverages both SIP and web services to implement reliable converged communications over IP networks. The application layer overlay framework of WSIP in the illustrative embodiments comprises a standard-based service integration environment which allows distributed service integration and remote monitoring, a more particular example of which will now be described with reference to FIG. 4.

Figure 4:
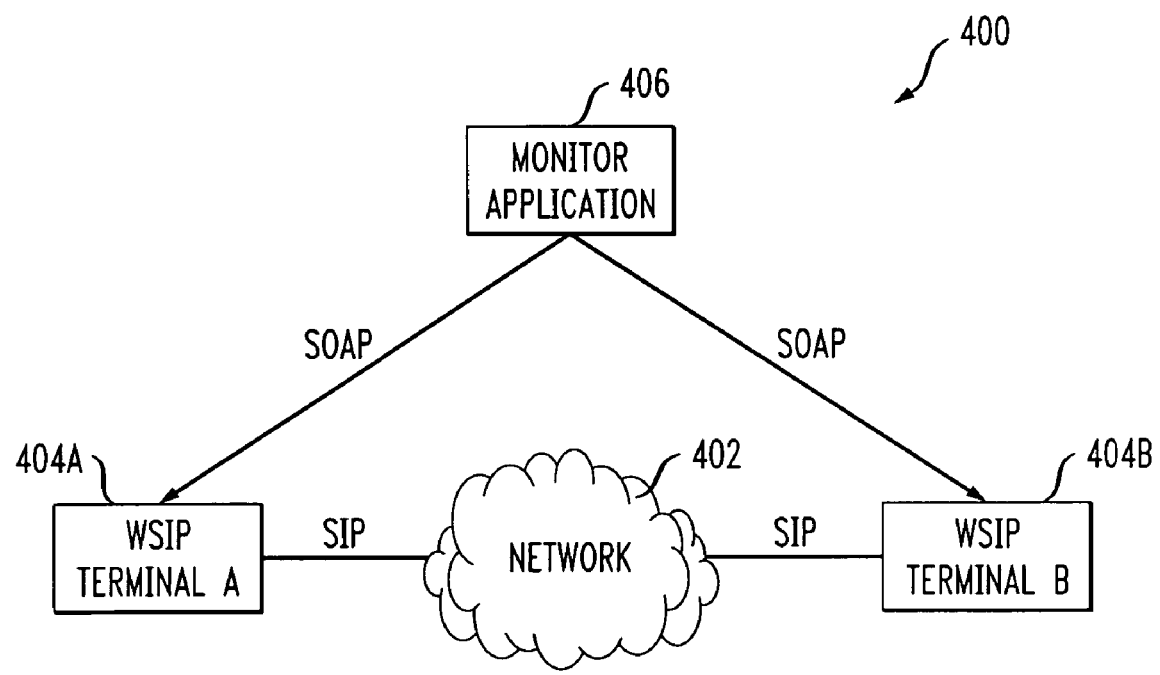
FIG. 4 shows one possible implementation of a network monitoring application implemented utilizing an application layer overlay framework in an illustrative embodiment of the invention.

FIG. 4 shows a communication system 400 comprising a network 402 which connects first and second WSIP endpoints 404A and 404B, also denoted as WSIP Terminal A and WSIP Terminal B, respectively. Each of the WSIP endpoints 404A and 404B may be configured in the manner described above in conjunction with FIGS. 1 and 2, and in this embodiment communicate with one another using SIP signaling over network 402. The WSIP endpoints 404A and 404B interact via SOAP signaling with a common monitor application 406, suitable for providing a network monitor service.

In this embodiment, communication in the SIP environment can be exposed as a private web service allowing an authorized network administrator to monitor the quality of the communication on demand. Certain information may be carried RTP and real-time transport control protocol (RTCP), as described in RFC 1889 of the IETF, hereby incorporated by reference herein. For example, an RTP/RTCP protocol stack can be used for delivery of both peer-to-peer media streams and network condition parameters, such as packet loss, interarrival jitter, and delay. These critical parameters can be calculated from transmission and reception statistics in respective sender reports (SR) and receiver reports (RR) in RTCP packets. Using the WSIP approach, this information can be accessed through web service and bound to service applications and transactions. For example, an application on a receiver WSIP endpoint 404A or 404B can launch a web service request to subscribe to the network monitor service of monitor application 406 when the packet loss, jitter or delay of the RTP/RTCP communication triggers an alarm at the receiver end. The network monitor service can be purely web service based without interfering with the current SIP session.

WSIP thus provides a way to administrate dynamic network resource management for communication services over IP. It allows the network resource management policies to be propagated on demand. In the case of network congestion, the network administrator can temporarily disable certain bandwidth resource demanding services on the endpoints in the network, and turn them back on later without interfering with other services. For example, it is possible to temporarily disable a video session between WSIP endpoints should a bandwidth shortage arise. This can be done in such a way that all on-going communication sessions between the WSIP endpoints are maintained, but no new video sessions can be established, by temporarily disabling a video coder option via web services. The video session capabilities can be turned back on by the network administrator, again via web services, should the congestion issues be resolved.

The present invention, as indicated above, may be implemented in the form of a terminal node or other endpoint which is both a SIP endpoint and a SOAP node. This provides a new type of communication endpoint based on both SIP and web services, and unifies these protocols in an efficient manner.

Such an endpoint may be used to deliver converged communication services over IP utilizing two application layer protocols at substantially the same time. This is fundamentally different from one-mode-at-a-time communication (e.g., SIP or web services (SOAP/HTTP)). In the illustrative embodiments, all communication services may be provided efficiently and seamlessly, although such services may be delivered or otherwise processed over two protocols (SIP and web services (SOAP/HTTP)), and through two different communication ports, at the same time (e.g., SIP typically uses port 5060 and web services typically uses port 80).

The invention thus provides a unified service integration environment based on web services that extends the separation of signaling and media transmission in SIP to a new multi-tier architecture that separates signaling, media transmission and service integration.

In accordance with an aspect of the invention, two application layer protocols (e.g., SIP and a web services transport protocol such as SOAP/HTTP) are utilized to achieve the application layer overly redundancy for reliable communication over IP. This is fundamentally different from physical network redundancy, where redundant physical network infrastructure is built and used to bypass troubled network access. Such redundant physical network infrastructure may be used, by way of example, to re-route a data packet through a completely different physical route (e.g., through a different physical wire, etc.).

The application layer overlay in the illustrative embodiments is achieved through the unification of two or more application layer protocols (e.g., SIP, SOAP, HTTP, etc.). Although these application layer protocols are on top of the same IP substrate (e.g., use the same IP transport layer), they have different reach, accessibility and are typically through different communication ports.

The binding of SOAP with HTTP (the application layer protocol being used by Internet) allows network services implemented via WSIP to be ubiquitous, especially in a case in which a given service cannot be accessed by other application layer protocols, such as SIP, SMTP, etc. due to the issues of firewall, network policies, etc. Web services is used to provide a standard interface, and it is the binding of SOAP with HTTP which makes this interface ubiquitous.

As a more particular example, an embodiment may comprise a group of web services enabled communication terminals or servers (e.g., WSIP terminals) in a network, with the terminals or servers configured to communicate with each other using specified communication protocols (e.g., SIP). Using the techniques of the invention, a network administrator can dynamically access the current status of each terminal or server, as well as current network conditions (e.g., delay, jitter and packet loss) between any two such network elements, through another application layer protocol such as SOAP/HTTP. Based on the information, the administrator can estimate the conditions of the entire network.

The WSIP approach of the illustrative embodiments described above provides substantial improvements over conventional techniques. In these embodiments, each WSIP node is both a SIP endpoint communicating via SIP over IP and a web services SOAP node that provides a native and generic service integration environment for bringing SIP-based communication in web services. The unification of SIP with web services in WSIP provides a new converged communication paradigm. It allows dynamic service discovery and binding that integrates SIP as a component in the business transaction.

There are a number of additional advantages associated with the WSIP approach of the illustrative embodiments. For example, the clear separation of service integration environment and SIP signaling in this approach avoids further complication of the existing SIP protocol, while leveraging the power of web services for implementing converged communication services. The ubiquitous service integration nature of web services provides a disciplined solution to maintain and update a large number of SIP endpoints from different installation bases. The WSIP approach also enables functions such as dynamic monitoring and updating of SIP endpoints, which are particularly useful when implementing VoIP and other converged communication services using SIP. Moreover, as indicated above, WSIP provides an extensible and modularized multi-tier architecture that separates service integration, signaling, and media transmission and provides enhanced capabilities which are not available in pure SIP-based endpoints.

As previously noted, one or more of the processing functions described above in conjunction with the illustrative embodiments of the invention may be implemented in whole or in part in software utilizing processor 202 and memory 204 associated with a processing element of the system. Other suitable arrangements of hardware, firmware or software may be used to implement the techniques of the invention.

It should again be emphasized that the above-described arrangements are illustrative only. For example, alternative embodiments may utilize different processing element configurations and different communication protocols than those of the illustrative embodiments. In addition, the invention can be applied to any type of SIP communications, including VoIP telephone calls, instant messaging, etc. These and numerous other alternative embodiments within the scope of the following claims will be apparent to those skilled in the art.

What is claimed is:

1. A method comprising:
    initiating a call from a first endpoint to a second endpoint via the Session Initiation Protocol;
    applying to the call an overlay framework that enables the first endpoint to maintain concurrent communication in two application layer protocols, wherein:
    (i) the first application layer protocol is the Session Initiation Protocol and the second application layer protocol is a web services protocol, and
    (ii) the overlay framework comprises support for (A) the web services protocol, (B) a Session Initiation Protocol user agent, and (C) an interface that communicates between the Session Initiation Protocol user agent and an application that uses the web services protocol; and executing the application by the first endpoint via the web services protocol, wherein:
(i) the operation of the Session Initiation Protocol user agent is independent of the operation of the application, and
(ii) the operation of the application does not require the cooperation of the second endpoint.

2. The method of claim 1 wherein the web services protocol comprises an application layer web services transport protocol.

3. The method of claim 2 wherein the application layer web services transport protocol comprises at least one of Simple Object Access Protocol and the Hypertext Transfer Protocol.

4. The method of claim 1 wherein the first endpoint is operative as both a Session Initiation Protocol endpoint and a Simple Object Access Protocol node.

5. The method of claim 1 wherein the first endpoint is utilizable in delivering converged communication services over Internet Protocol utilizing the two application layer protocols.

6. The method of claim 1 wherein the first endpoint is part of a service integration environment comprising a multi-tier architecture that separates signaling, media transmission and service integration.

7. The method of claim 1 wherein the first endpoint is implemented in a processing element comprising a processor coupled to a memory.

8. The method of claim 1 wherein the first endpoint comprises:
a first component configured for communication with one or more other endpoints; and
a second component configured for interfacing the first component to the application.

9. The method of claim 1 wherein the call is accessible as a web service allowing on-demand monitoring of the quality of service of the call.

10. The method of claim 1 wherein transmission and reception statistics associated with the call are computed from respective sender reports and receiver reports of real-time transport control protocol packets.

11. The method of claim 1 further comprising a network monitor service application that is accessible to the first endpoint via a web service request.

12. The method of claim 11 wherein the web service request is triggered responsive to an alarm indicating that one or more network condition parameters have deviated from desired values.

13. The method of claim 1 wherein the overlay framework is utilizable in administration of dynamic network resource management for communication services over Internet Protocol networks.

14. The method of claim 1 wherein the overlay framework is configured to control implementation of one or more network resource management policies on demand.

15. The method of claim 1 wherein the overlay framework is utilizable to disable one or more bandwidth demanding services on the first endpoint and the second endpoint while the call remains active.

16. The method of claim 15 wherein the interface of the overlay framework is utilizable to disable a first communication session between the first endpoint and the second endpoint in the presence of a bandwidth shortage without disrupting a second communication session between the first endpoint and the second endpoint, wherein the first communication session is one of the call and the application.

17. The method of claim 16 wherein the interface of the overlay framework is utilizable to re-enable the first communication session.

18. The method of claim 1 wherein the application operates between the first endpoint and a third endpoint.

19. An article of manufacture comprising a Non-transitory machine-readable storage medium containing software code that when executed implements the steps of:
initiating a call from a first endpoint to a second endpoint via the Session Initiation Protocol;
applying to the call an overlay framework that enables the first endpoint to maintain concurrent communication in two application layer protocols, wherein:
(i) the first application layer protocol is the Session Initiation Protocol and the second application layer protocol is a web services protocol, and
(ii) the overlay framework comprises support for (A) the web services protocol, (B) a Session Initiation Protocol user agent, and (C) an interface that communicates between the Session Initiation Protocol user agent and an application that uses the web services protocol; and
executing the application by the first endpoint via the web services protocol, wherein:
(iii) the operation of the Session Initiation Protocol user agent is independent of the operation of the application, and
(iv) the operation of the application does not require the cooperation of the second endpoint.

20. The method of claim 19 wherein the application operates between the first endpoint and a third endpoint.

* * * * *